United States Patent Office 3,296,338
Patented Jan. 3, 1967

---

3,296,338
BLOCK COPOLYMERS OF ETHYLENE AND PROPYLENE
James L. Jezl, Swarthmore, and Habet M. Khelghatian, Springfield, Pa., and Louise D. Hague, Wilmington, Del., assignors to Avisun Corporation, Wilmington, Del., a corporation of Delaware
No Drawing. Filed Dec. 10, 1962, Ser. No. 243,613
1 Claim. (Cl. 260—878)

This invention relates to a process for manufacturing block copolymers of ethylene and propylene having improved impact resistance and brittle points as compared to polypropylene alone.

We have found that such polymers may be prepared by initially contacting a first feed which may be propylene alone or propylene in admixture with a small quantity of ethylene, in solution in an inert hydrocarbon solvent, with a catalyst system consisting of titanium trichloride, a dialkyl aluminum halide, and a glycol ether. After the polymerization has proceeded for a desired length of time, passage of the first feed to the reactor is discontinued, and a second feed, which may be ethylene, or a mixture of ethylene and propylene richer in ethylene than the first feed stream, is passed to the reactor, and polymerization is continued for a second period of time, after which the reaction is stopped by the addition of a polar material, such as an alcohol. Proceeding in this manner, a two-segment block polymer is produced, the first segment of which is polypropylene or a copolymer rich in propylene, and the second segment of which is polyethylene, or a copolymer richer in ethylene than the first segment. Alternatively, the two feeds may be alternated two or more times, yielding a polymer having three or more segments of varying ethylene content.

In carrying out block polymerization in accordance with the invention, the catalyst components are generally dissolved or suspended in an inert hydrocarbon solvent such as hexane, heptane, or octane, or mixtures thereof, in an appropriate reaction vessel equipped with means to agitate the contents thereof, in the absence of oxygen or moisture. The catalyst containing solvent is then usually brought to a temperature in the range of 25° C. to 150° C., preferably 60° C. to 80° C., and the olefin or mixture of olefins to be polymerized is then pressured into the reactor. Moderately elevated pressures, as from 20 p.s.i.g. to 50 p.s.i.g. are used in order to increase the amount of olefin dissolved in the solvent, and thus speed the reaction.

The aluminum component of the catalyst system of this invention may be any dialkyl aluminum halide, such as diethyl aluminum chloride, dipropyl aluminum chloride, dibutyl aluminum chloride, or the corresponding bromine or iodine analogues, as well as dialkyl aluminum halides the ethyl radicals of which contain greater numbers of carbon atoms than those illustrated above. The glycol ether component of the catalyst may be any glycol ether, such as ethylene glycol dimethyl or diethyl ether, and corresponding di-ethers of diethylene glycol, triethylene glycol, or higher glycols. The atomic ratio of aluminum to titanium in the catalyst system should be from about 0.2:1 to 10:1, preferably from 1:1 to 3:1. The ratio of aluminum to glycol oxygen should be from about 1:0.06 to about 1:.01.

As previously stated, the initial feed to the reactor may be propylene alone, or it may be a mixture of propylene with a small amount of ethylene, the ratio of propylene to ethylene being preferably in the range of 98.5:1.5 to 95:5. The second feed may be ethylene, or mixtures of ethylene and propylene richer in ethylene than the initial feed. In any event, the quantities of the two feeds should be so adjusted that the ethylene content of the total polymer, including pentane-soluble polymer is from about 3% to about 15%. If desired, hydrogen may be added to either or both feeds in order to control the flow rate of the product. Flow rate is obtained by the procedure outlined in ASTM D1238-57T for obtaining the melt index of polyethylene, except that a temperature of 230° C. is used instead of 190° C.

In order that those skilled in that art may more fully appreciate the nature of this invention and the method for carrying it out, the following examples are given.

*Example I*

Polymerization was carried out in accordance with the following procedure. A pressure reactor fitted with stirring means was flushed with nitrogen, and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. The contents of the reactor were then brought to a temperature of 162° F., hydrogen was added in an amount of 16 parts per million by weight based on the weight of the hexane, and propylene was pressured in at 75 p.s.i.g. Polymerization of propylene commenced immediately, and was continued for 85 minutes, after which flow of pure propylene was discontinued, and a second feed, which consisted of 24% ethylene and 76% propylene, was pressured into the reactor. Polymerization was continued with this feed for 85 minutes, after which the reaction was killed by the addition of methanol. The reaction product was worked up, and a solid, highly crystalline block polymer was recovered. The total polymer contained 7.2% ethylene, as calculated from a material balance, and the solid block polymer, which amounted to 80% of the total polymer had a flow rate of 2.3, a brittle point of −13.5° C., as determined by ASTM D746-57T and a tensile impact strength as determined by ASTM 1822-61T of 94. Pure polypropylene of this flow rate has a brittle point of 14° C. and a tensile impact strength of 28.

*Example II*

The general procedure of Example I was followed, except that the initial feed was a mixture 3% ethylene and 97% propylene, and hydrogen was present in an amount of 20 p.p.m. Initial propylene partial pressure was 75 p.s.i.g. Total pressure was 83 p.s.i.g Polymerization of this feed mix was continued for 20 minutes, followed by pure ethylene for 8 minutes, followed by the initial mixture for 27 minutes, followed by ethylene for 15 minutes, followed by the mixture for 45 minutes, followed by ethylene for 19 minutes, followed by the mixture for 56 minutes. The reaction was then killed and the polymer was recovered. It had an ethylene content of 11.5%, and the pentane insoluble portion, which has 70% of the total polymer, had a flow rate of 1.8, a brittle point of −9° C., and a tensile impact strength of 47. Polypropylene of this flow rate has a brittle point of 10° C. and a tensile impact strength of 33.

*Example III*

The procedure of Example II was followed, except that the polymerization cycle was first mixed 14 minutes, ethylene 3 minutes, first feed 17 minutes, ethylene 3 minutes, first feed 26 minutes, ethylene 7 minutes, first feed 26 minutes, ethylene 8 minutes, first feed 16 minutes, to yield a product containing 9.1% ethylene. The flow rate of the pentane-insoluble portion of the polymer was 3.3, the brittle point −2° C., and the tensile impact strength was 46. Polypropylene of this flow rate normally has a brittle point of 18° C., and a tensile impact strength of 22. Films made from the polymer of this example had a much greater clarity than polypropylene films.

*Example IV*

The catalyst system of the preceding examples was also used in this example. Temperature of reaction was 163° F., and the pressure was 81 p.s.i.g. 18 p.p.m. of hydrogen were used. In this case propylene was first polymerized for 12 minutes, followed by ethylene for 5 minutes without purging unreacted propylene from the reactor. This procedure was repeated three times, times of polymerization being propylene 9 minutes, ethylene 5.5 minutes, propylene 8.5 minutes, ethylene 4.5 minutes, propylene 10.5 minutes, and ethylene 5.5 minutes, followed by polymerization of propylene for 5.5 minutes. The product had a calculated ethylene content of 5.8%, and the pentane-insoluble portion, which was 77% of the total, had a flow rate of 2.8, a brittle point of −5° C., and a tensile impact strength of 44.

*Example V*

Example IV was repeated, except that the times of polymerization were 15 minutes, ethylene 5 minutes, propylene 11 minutes, ethylene 8 minutes, propylene 13 minutes, ethylene 5 minutes, propylene 16 minutes, ethylene 9 minutes, and propylene 8 minutes, to yield a product containing 5.2% ethylene. The flow rate of the pentane-insoluble portion was 5.0, the brittle point −2° C., and the tensile impact strength was 33. Polypropylene of this flow rate has a brittle point of 23° C., and a tensile impact strength of 16.

*Example VI*

The procedure of Example IV was repeated, except that 20 p.p.m. of hydrogen were used; the first feed was 3% ethylene and 97% propylene and the second feed was 26% ethylene and 74% propylene. The order of polymerization was first feed 16 minutes, second feed 16 minutes, first feed 16 minutes, second feed 19 minutes, first feed 14 minutes, second feed 28 minutes, first feed 11 minutes, second feed 30 minutes, and first feed 12 minutes. The copolymeric product contained a calculated 5.7% ethylene, and the pentane-insoluble portion had a flow rate of 1.5, a brittle point of −5° C., a tensile impact strength of 67.4, and a tensile strength of 4200 p.s.i.

*Example VII*

Example VI was repeated, except that the polymerization cycle was first feed 12 minutes, second feed 5 minutes, first feed 3 minutes, second feed 3 minutes, first feed 5 minutes, second feed 2 minutes, first feed 6 minutes, second feed 4 minutes, first feed 3 minutes. The product contained a calculated 3.1% ethylene, and the pentane-insoluble portion had a flow rate of 7.4, a brittle point of −1° C., a tensile impact strength of 32.3, and a tensile strength of 4500 p.s.i. Polypropylene of this flow rate has a brittle point of 25° C. and a tensile impact strength of 15.

*Example VIII*

Example VI was repeated, except that the hydrogen level was 18 p.p.m., and the polymerization cycle was first feed 31 minutes, second feed 18 minutes, first feed 5 minutes, second feed 13 minutes, first feed 3 minutes, second feed 13 minutes, first feed 6 minutes, second feed 23 minutes, first feed 1 minute. The product contained a calculated 9.1% ethylene, and the pentane-insoluble portion had a flow rate of 2.1, a brittle point of −13.8° C., a tensile impact of 66.6, and a tensile strength of 4100 p.s.i.

*Example IX*

Example VI was repeated, except that the second feed consisted of 70% ethylene and 30% propylene. The polymerization cycle was first feed 8 minutes, second feed 6 minutes, first feed 7 minutes, second feed 10 minutes, first feed 10 minutes, second feed 7 minutes, first feed 9 minutes, second feed 7 minutes, first feed 4 minutes. The product contained a calculated 16.5% ethylene, and the pentane-insoluble polymer had a flow rate of 2.1, a brittle point of −15° C., and a tensile impact strength of 72.3.

*Example X*

Example VI was repeated, except that the second feed was 51% ethylene and 49% propylene. The polymerization cycle was first feed 7 minutes, second feed 4 minutes, first feed 4 minutes, second feed 3 minutes, first feed 9 minutes, second feed 3 minutes, first feed 8 minutes, second feed 4 minutes, first feed 4 minutes. The product had a calculated ethylene content of 5.7%, and the pentane-insoluble polymer a flow rate of 2.9, a brittle point of −9° C., and a tensile impact strength of 68.9.

The invention claimed is:

A process for the preparation of block copolymers of ethylene and propylene which comprises contacting a first feed selected from the group consisting of propylene and mixtures of propylene and ethylene containing from about 1.5% to 5% ethylene, in an inert solvent with a catalyst system consisting of aluminum dialkyl monochloride, titanium trichloride, and a polyethylene glycol dimethyl ether, the mol ratio of aluminum dialkyl monochloride to titanium trichloride being in the range of 0.2:1 to 10:1, and the atomic ratio of aluminum to glycol ether oxygen being from about 1:0.06 to 1:0.01, discontinuing the first feed, and contacting the catalyst system with a second feed selected from the group consisting of ethylene and mixtures of ethylene and propylene having a higher ethylene content than the first feed, and recovering a pentane-insoluble product having a lower brittle point and higher tensile impact strength than polypropylene of equivalent flow rate.

References Cited by the Examiner

UNITED STATES PATENTS 3,159,615   12/1964   Weeks et al. _____ 260—94.9

FOREIGN PATENTS 556,974   10/1957   Belgium.
594,018   5/1959    Italy.
601,560   2/1960    Italy.
615,048   1/1961    Italy.
809,717   3/1959    Great Britain.
884,116   12/1961   Great Britain.

OTHER REFERENCES

Natta: Journal of Polymer Science, vol. 34, 1959 (pp. 531–549 relied upon).

MURRAY TILLMAN, *Primary Examiner.*

SAMUEL H. BLECH, *Examiner.*

W. L. BASCOMB, D. J. BREZNER, *Assistant Examiners.*